US006647844B1

(12) United States Patent
Nowaczyk

(10) Patent No.: US 6,647,844 B1
(45) Date of Patent: Nov. 18, 2003

(54) PRECISE STRIP MATERIAL CUTTER

(75) Inventor: David J. Nowaczyk, Carol Stream, IL (US)

(73) Assignee: Moore Wallace Incorporated, Bannockburn, IL (US)

( * ) Notice: Subject to any disclaimer, the term of this patent is extended or adjusted under 35 U.S.C. 154(b) by 0 days.

(21) Appl. No.: 08/848,726

(22) Filed: May 22, 1997

(51) Int. Cl.[7] ......................... B23D 33/02; B23D 33/10; B26D 7/01; B26D 7/18

(52) U.S. Cl. ............................ 83/134; 83/129; 83/262; 83/268; 83/356.2; 83/419; 83/436.3; 83/436.5; 83/444; 83/451; 83/467.1; 83/468.7; 83/628; 83/649; 83/734; 83/949; 269/8

(58) Field of Search .......................... 83/247, 263, 268, 83/419, 468.6, 468.7, 649, 436.45, 436.5, 602, 907, 950, 81, 82, 451, 78, 240, 241, 253–256, 269, 369, 391, 467.1, 468, 468.5, 650, 109, 111, 129, 132, 134, 236, 257, 262, 350, 355, 356.2, 420, 421, 436.3, 436.6, 438, 443, 444, 448–450, 588, 734, 949; 140/139, 140; 269/8

(56) References Cited

U.S. PATENT DOCUMENTS

| | | | | | |
|---|---|---|---|---|---|
| 492,574 | A | * | 2/1893 | Dayton | 140/140 X |
| 1,071,121 | A | * | 8/1913 | Weber | 83/628 X |
| 1,784,556 | A | * | 12/1930 | Townsend et al. | 83/269 X |
| 2,047,322 | A | * | 7/1936 | Hazelton | 83/468.7 X |
| 2,332,013 | A | * | 10/1943 | Rudert et al. | 83/602 X |
| 2,446,146 | A | * | 7/1948 | Tucker | 83/391 |
| 2,603,291 | A | * | 7/1952 | Williams | 83/468.7 X |
| 2,637,394 | A | * | 5/1953 | Fey | 83/628 X |
| 3,137,190 | A | * | 6/1964 | Mosher et al. | 269/8 X |
| 3,176,556 | A | * | 4/1965 | Roberts et al. | 83/391 X |
| 3,738,504 | A | * | 6/1973 | Vail et al. | 83/468.7 X |
| 3,793,916 | A | * | 2/1974 | Jarman | 83/419 X |
| 3,830,121 | A | * | 8/1974 | Makeev et al. | 83/208 X |
| 3,861,261 | A | * | 1/1975 | Maxey | 83/419 X |
| 3,892,155 | A | * | 7/1975 | Gerlach | 83/468.7 X |
| 3,942,829 | A | | 3/1976 | Humble et al. | 70/57.1 |
| 4,036,087 | A | * | 7/1977 | Braun | 83/79 |
| 4,077,287 | A | * | 3/1978 | Makeev et al. | 83/649 X |
| 4,219,052 | A | * | 8/1980 | Aronhalt | 140/140 |
| 4,255,997 | A | * | 3/1981 | Clay | 83/649 X |
| 4,457,195 | A | * | 7/1984 | Brooks | 83/649 X |
| 4,679,473 | A | * | 7/1987 | Hirata et al. | 83/468.7 X |
| 4,856,392 | A | * | 8/1989 | Appelberg | 83/50 X |
| 5,469,140 | A | | 11/1995 | Liu et al. | 340/551 |
| 5,493,275 | A | | 2/1996 | Easter | 340/572 |
| 5,495,230 | A | | 2/1996 | Lian | 340/551 |
| 5,499,015 | A | | 3/1996 | Winkler et al. | 340/551 |
| 5,588,345 | A | * | 12/1996 | Franks et al. | 83/649 X |

* cited by examiner

*Primary Examiner*—Clark F. Dexter
(74) *Attorney, Agent, or Firm*—Roylance, Abrams, Berdo & Goodman, LLP

(57) ABSTRACT

An apparatus for precisely cutting lengths of strip material includes a supply of strip material, a feed mechanism for conveying the strip material from the supply and a reciprocating cutter mounted downstream of the feed mechanism. An adjustable stop is movably mounted adjacent the cutter for engaging an end of the strip material and setting a precise length of the strip material being cut. An adjustment mechanism is coupled to the stop for moving the stop relative to the cutter along a longitudinal axis of the length of the strip material being cut.

58 Claims, 5 Drawing Sheets

PRECISE STRIP MATERIAL CUTTER

REFERENCE TO RELATED APPLICATION

This application is related to U.S. patent application Ser. No. 08/861,522, now U.S. Pat. No. 6,096,153, filed concurrently herewith in the name of David J. Nowaczyk, and entitled SYSTEM FOR CONTINUOUSLY MANUFACTURING SECURITY TAGS, the subject matter of which is hereby incorporated by reference.

FIELD OF THE INVENTION

The present invention relates to an apparatus for precisely cutting lengths of strip material from a continuous supply of the strip material. More particularly, the present invention relates to an apparatus which precisely locates a section of strip material adjacent a movable cutter, permitting the cutter to sever the strip material into precisely dimensioned lengths.

BACKGROUND OF THE INVENTION

In certain manufacturing processes, a supply of strips of material, particularly metal, are required. The strips must be cut to exact lengths to provide certain characteristics, e.g., for generating an electrical signal at a specific frequency.

The material is usually supplied in rolls of a predetermined width and thickness. Strips of exact length are then to be cut from the roll of material such that the exact length strips can be used in manufacture of a particular item.

Due to the high degree of precision and very small tolerances allowed in the forming of the strips, the strip length may need to be varied, depending upon material variations within the roll of the strip material. Specifically, the length of the strip being cut fine tunes the final product, where the length may need to be varied to compensate for the variations in the material to be cut.

The strips are often used in a mass produced product having a low unit cost. Thus, the strips must be effectively and quickly produced in an economical and automatic manner. Additionally, the cut strips must be in a position which allows them to be inserted in or combined with other parts to produce a final product.

Conventional apparatus for cutting strips of this type are relatively slow and inefficient. Each cutting apparatus must be individually controlled by an operator, and thus, is not fully automatic. The lack of automatic operation increases the cost of production and limits the speed of production. A precisely, elongated strip is needed to form a resonator strip for a security tag. The resonator strip converts magnetic energy to mechanical energy, and then reconverts that mechanical energy back to electromagnetic energy that generates a signal. Specifically, resonator strips are magnetostrictive elements which store energy by contracting in a magnetic field. When the magnetic field is removed, the magnetostrictive elements expand and vibrate at a resonant frequency to generate an electromagnetic wave that can be received to activate a signal. The length of the resonator strip determines its frequency. Unacceptable variations in the resonator strip length will cause the generation of the wrong frequency, resulting in the security tag becoming inoperative.

SUMMARY OF THE INVENTION

An object of the present invention is to provide an apparatus for precisely cutting lengths of strip material at great speed accurately and automatically.

Another object of the present invention is to provide an apparatus for precisely cutting lengths of strip material which can compensate for variations in the strip material supplied to the cutter.

The foregoing objects are basically obtained by an apparatus for precisely cutting lengths of strip material. The apparatus comprises a supply of strip material, feed means for conveying the strip material from the supply, and a reciprocating cutter mounted downstream of the feed means. An adjustable stop is movably mounted adjacent the cutter for engaging an end of the strip material and setting a precise length of the strip material being cut. Adjustment means is coupled to the stop for moving the stop relative to the cutter along a longitudinal axis of the length of the strip material being cut.

By forming the apparatus in this manner, the apparatus can be used with a test mechanism to verify the correct length of the strip material. If the material is cut to the wrong length, for example, due to material variations in the strip material being supplied, the final product can be fine tuned by operating the adjustment means, in response to the signal from the test mechanism to move the stop, as necessary, to correct the strip material length.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
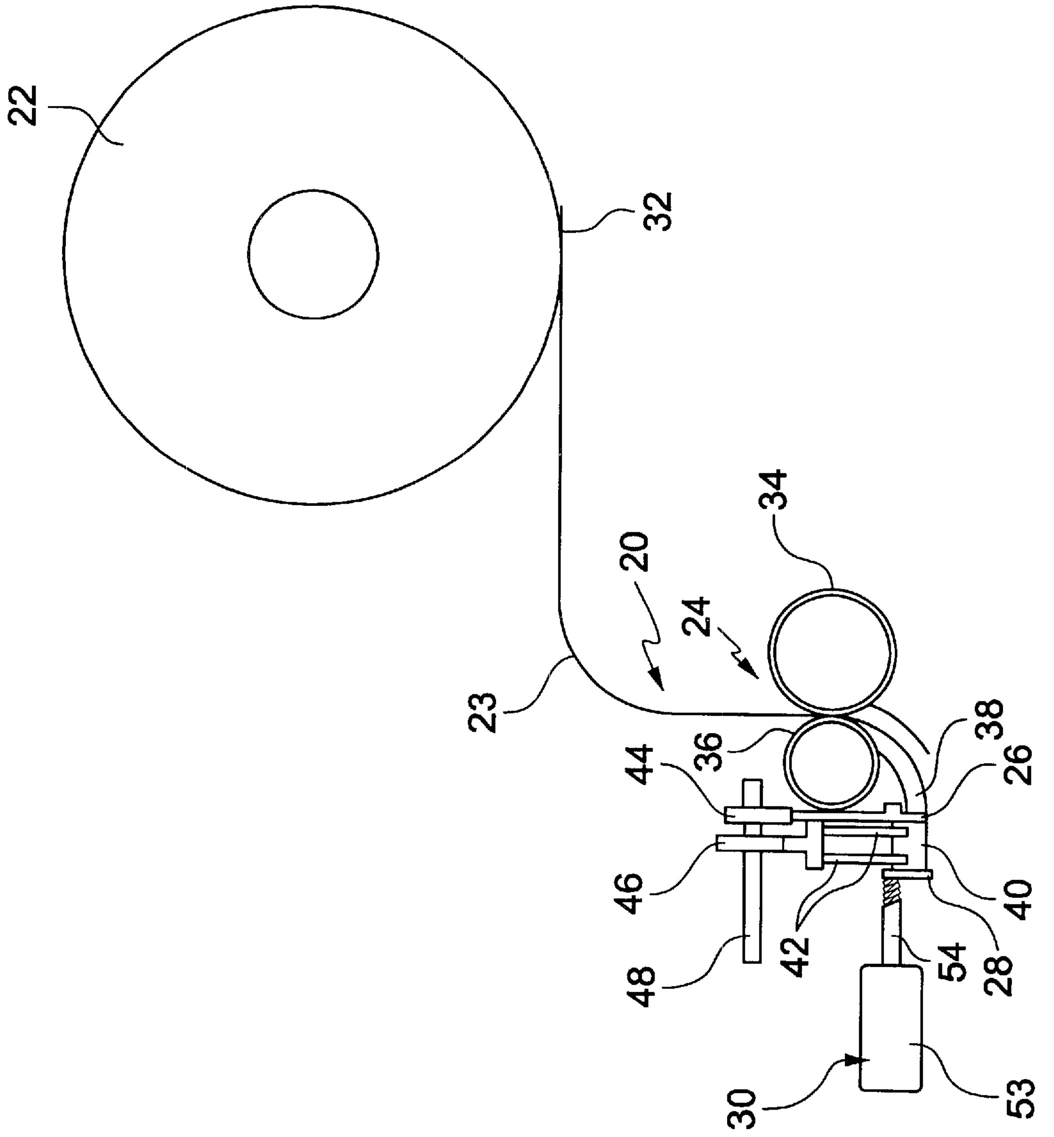
FIG. 1 is a graphical, side elevational view diagramatically illustrating a cutting apparatus according to the present invention.

The basic features of the strip cutting apparatus 20 of the present invention are graphically illustrated in FIG. 1. The apparatus comprises a supply or supply wheel 22 of strip material which is conveyed by a feed means 24 to a reciprocating cutter 26. An adjustable stop 28 is movably mounted adjacent cutter 26 for engaging a free end of the strip material and setting a precise length of the strip material to be cut. Adjustment means 30 is coupled to stop 28 for moving the stop relative to cutter 26 along a longitudinal axis of the length of strip material being cut.

Supply 22 is in the form of a spirally wound wheel or roll of the strip material. The dispensing of the strip material from supply 22 is controlled by a drag brake 32 mounted adjacent supply 22.

Feed means 24 controls the tension of the strip material, and includes feed drive wheels 34 and 36 for conveying the strip material at a rate of approximately 160 feed per minute. From the feed drive wheels, the strip material 23 is fed through a feed chute 38 to a low magnetic strip holder or slide bed 40. The strip holder is magnetized for maintaining the magnetizable strip material in position for the cutting by cutter 26. The strip material is fed until its free end engages stop 28.

After the length of strip material is cut, it is removed or forced from the strip holder by ejector pins 42. The ejector pins reciprocate in a vertical direction parallel to the vertical reciprocation of cutter 26.

Cutter 26 and ejector pins 42 are mounted for reciprocal sliding motion. The movement of cutter 26 is controlled by a rotating cam 44. The reciprocal movement of ejector pins 42 is controlled by rotating cam 46. The cams are rotated by a suitable drive 48.

As graphically illustrated in FIG. 1, the adjustment means basically comprises an electric stepper motor 53 which is coupled to an externally threaded rod 54 for rotating the rod and which can selectively move in annular increments of a partial rotation. Very fine threads on rod 54 are engaged with mating very fine threads on stop 28 such that rotation of rod 54 will cause precise movement of stopper 28 in increments of 0.0001 inch, toward and away from cutter 26 along the longitudinal axis of the strip material being cut, i.e., transverse to the reciprocating motion of cutter 26. In this manner, electrical impulses to motor 53 can be used to operate the motor and set stop 28 in various positions for precisely controlling the length of the strip material being cut.

Figure 2:
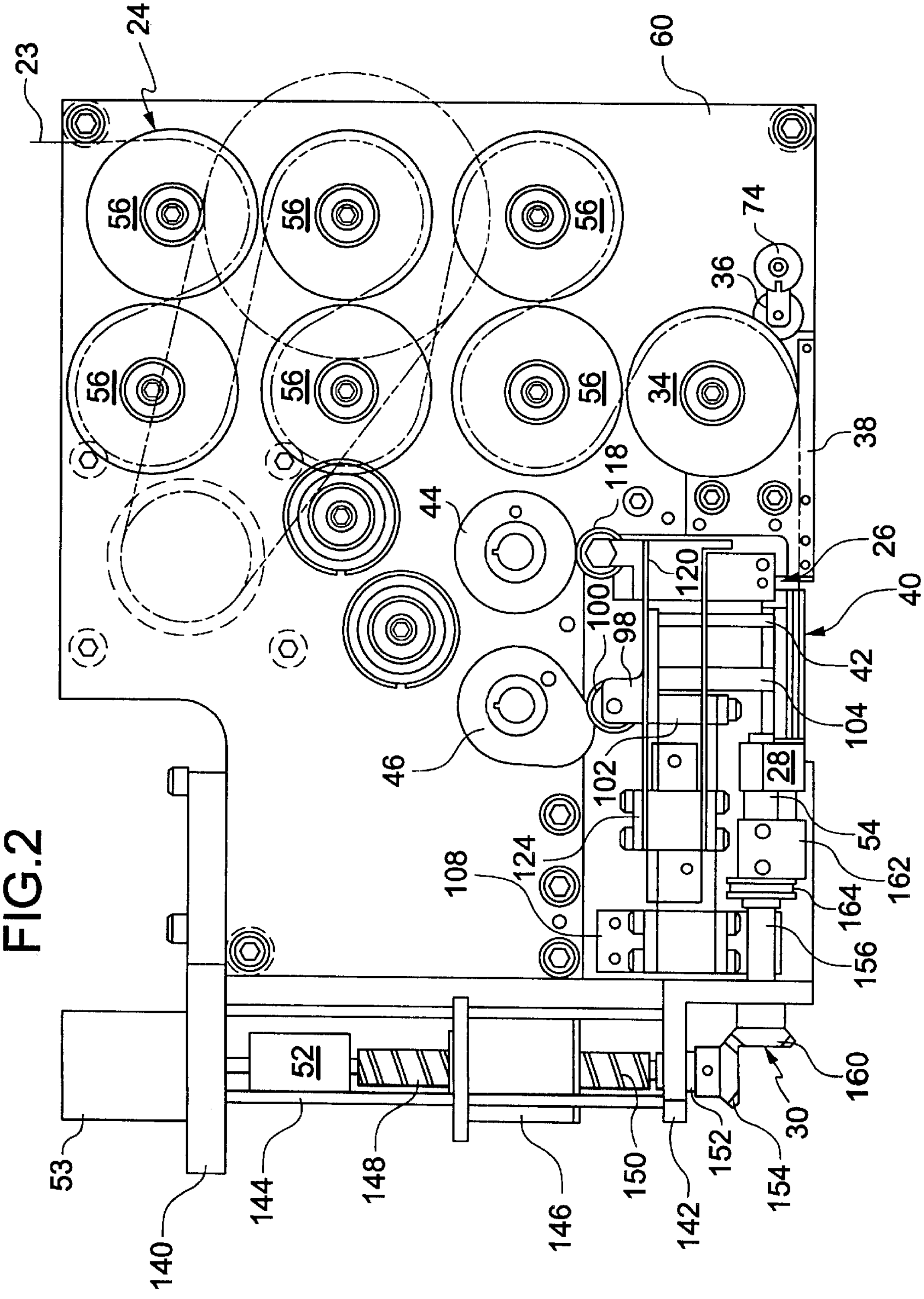
FIG. 2 is a side elevational view of the cutting apparatus according to the present invention.

Further details of the cutting apparatus of the present invention are illustrated in FIGS. 2–11. Strip material 23 from supply 22 (not shown in FIG. 2) is fed to feed means 24 which, as illustrated in FIG. 2, comprises a plurality of annular drivers 56. Each driver comprises an outwardly opening, peripheral groove 58 for receiving strip material 23. The drivers are arranged in two parallel rows, and define a serpentine path to control the tension applied to the strip and to facilitate an even flow of the material adjacent cutter 26.

The rollers are mounted on a support 60 along with feed drive wheels 34 and 36. Each of feed drive wheel 34 and drivers 56 is non-rotatably coupled to a coaxially mounted gear 62. Gears 62 mesh with each other directly or through other gears 64 to define a single drive train for all drivers 56 and feed drive wheel 34. A single servo drive motor 66 powers this drive train. Drive motor 66 rotates a pulley 68. Pulley 68 is coupled to a pulley 70 by a drive belt 72 for simultaneous rotation. Pulley 70 is then non-rotatably coupled to the rotating shaft for one of the gears 62. In this manner, motor 66 rotates pulley 68 and then pulley 70 through drive belt 72. Rotation of pulley 70 causes one of the gears 62 to rotate which, in turn, rotates all of the remaining gears 62 and 64 of the drive train to rotate all of the drivers 56 and the feed drive wheel 34.

Figure 11:
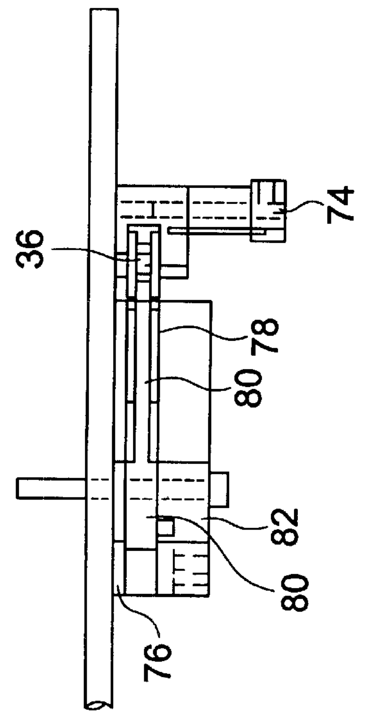
FIG. 11 is a top plan view of the feed mechanism of FIG. 10.
Figure 10:
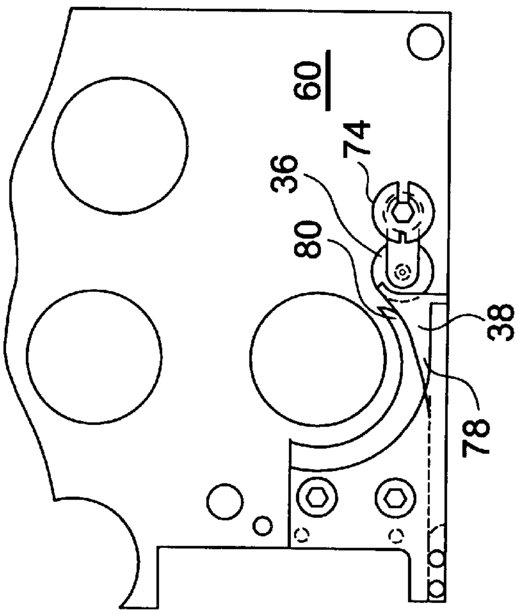
FIG. 10 is a side elevational view of a portion of the feed mechanism for the cutting assembly of FIG. 2.

The strip material is delivered to feed chute 38 through a nip formed by feed drive wheels 34 and 36. A nip adjustment knob 74 is coupled to feed drive wheel or nip roller 36 to adjust the nip force. As illustrated in FIGS. 10 and 11, feed chute 38 includes a back guide 76, a bottom guide 78, a top guide 80 and a front guide 82. The front and back guides engage the front and back edges of the strip. Top and bottom guides engage the top and bottom surfaces of the strip. These four guides control the movement of the strip along a curved path such that the strip will be delivered to strip holder 40 in the proper position.

Figure 6:
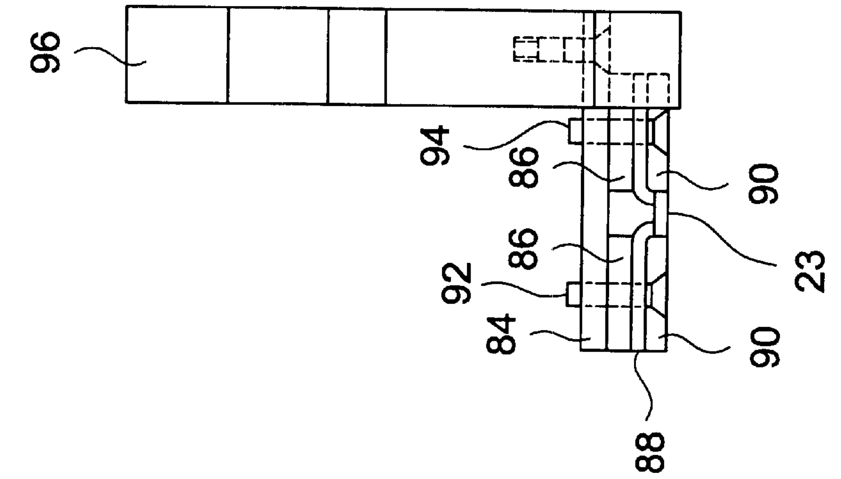
FIG. 6 is an end elevational view of the portion of the cutting apparatus of FIG. 5.
Figure 5:
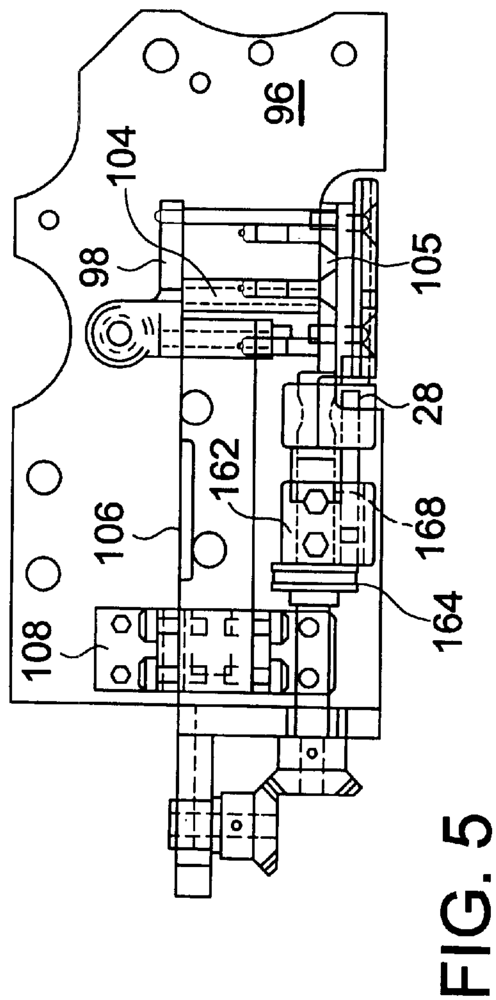
FIG. 5 is a side elevational view of a portion of the cutting apparatus, particularly the ejector pin, stop and stop adjustment mechanism, with other portions removed for illustration.

Referring to FIGS. 2, 5 and 6, particularly FIGS. 5 and 6, strip holder 40 for retaining strip 23 in position during cutting comprises a slide platform 84, a pair of magnetic strips 86 mounted on the lower surface of the slide platform, a pair of slide rails 88 mounted on the lower surface of the magnetic strips and a pair of magnetic spacers 90 mounted on the lower surface of the slide rails. One magnetic spacer, one slide rail and one magnetic strip are attached to the platform by a screw 92. The other magnetic spacer, slide rail and magnetic strip are attached to slide platform 84 by screw 94, and are positioned parallel and laterally spaced relative to the other magnetic spacer, side rail and magnetic strip of the strip holder attached by screw 92. The strip material 23 being cut has its longitudinal side edges in engagement with magnetic spacers 90. The slide rails have downwardly projecting portions at their adjacent edges which engage upper surface portions of the metal strip material 23. The magnetic strips or 86 attract the magnetizable metal strip material 23 to retain the strip material in place. Slide platform 84 is secured by screws to support 96. Spaces are provided between the various parts of the strip holder to allow access to strip material 23 held therein from above.

Ejector pins 42, as illustrated in FIGS. 2 and 5, are mounted on and depend from an ejector fork 98. The upper end of the ejector fork has a rotatably mounted cam follower 100. The lower portions of the cam fork support ejector pins 42 and an ejector bobber 102. The second ejector pin 42 extends within a spring 104. Spring 104 engages on one end on the support structure 105 and on its upper end on ejector fork 98. In this manner, spring 104 biases the ejector pins in an upward direction and biases cam follower 100 against ejector cam 46. As cam 46 rotates, it pushes the pins through cam follower 100 and ejector fork 98 downwardly against the force of the spring 104 or allows the pins, ejector fork and cam follower to move upwardly with the cam follower in engagement with the peripheral surface of cam 46. Cam 46 has a gear coaxially mounted thereon in the same manner as the gears for drivers 56 and is engaged with the same gear train. Thus, cam 46 moves and is driven by servo drive motor 66.

Each ejector assembly of the ejector pins, ejector fork and cam follower is mounted on a flexible ejector beam 106. The ejector beam is coupled to support 96 by its rigid connection to fixed ejector spacer 108. Spacer 108 is fixedly connected to support 96. The ejector beam flexes or bends with ejector pin movement as controlled by cam 46. Upon removal of the load, the beam returns to its original position.

Figure 9:
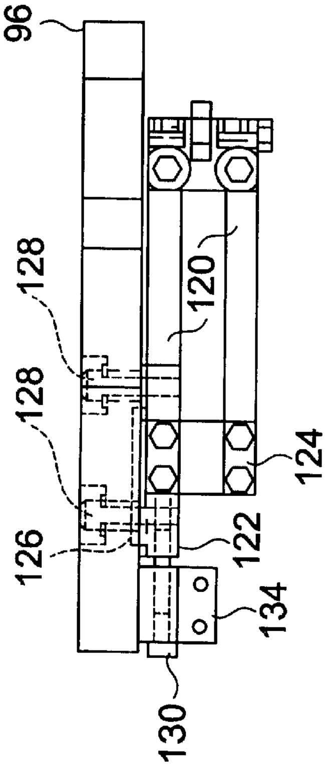
FIG. 9 is a top plan view of the portion of the apparatus illustrated in FIG. 8.
Figure 8:
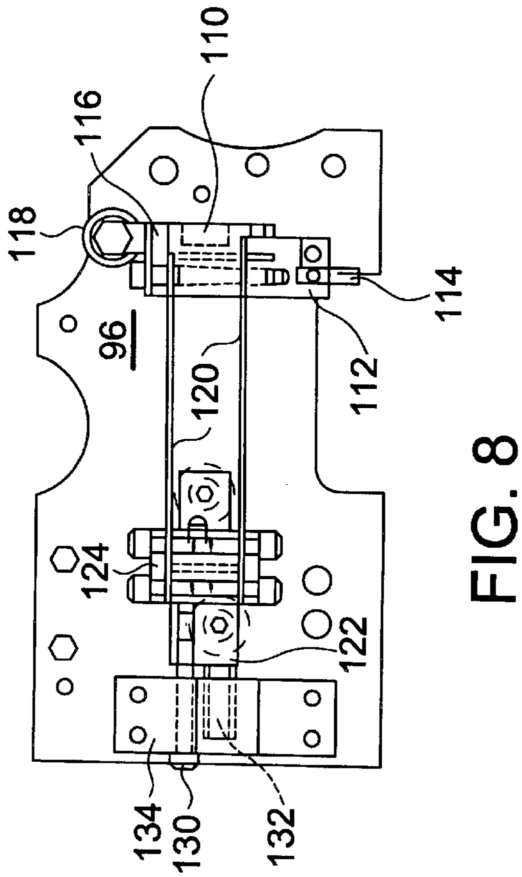
FIG. 8 is a side elevational view showing details of the mounting of the cutter, with other portions removed for illustration.

Cutter 26, as illustrated in FIGS. 2, 8 and 9, comprises a knife bobber 110. The lower end of the knife bobber has a knife holder 112 for releasably retaining a knife 114. The releasable engagement of knife 114 in holder 112 permits and facilitates replacement of the knife. The upper end of the knife bobber is connected to a knife fork 116. The end of the knife fork opposite bobber 110 rotatably supports a cam follower 118. Cam follower engages the periphery of knife cam 44. Rotation of knife cam 44 causes cutter 26 to reciprocate up and down for the cutting action. Like ejector cam 46, knife cam 44 has a coaxially fixedly mounted gear which is connected to the drive train operated by servo motor 66 to cause the appropriate rotation of knife cam 44.

Knife bobber 110 is connected to adjacent ends of flexible knife beams 120 which bias cam follower 118 upwardly into contact with knife cam 44. No additional springs are required. The knife beams are supported by and connected to support 96 by fixed knife spacer 122 and beam clamp 124. Beam clamp 124 is mounted on fixed knife spacer 122. The fixed knife spacer is located and set on support 96 by knife block gib 126. Screws 128, as well as adjustment screw 130 and spring 132, extending from bracket 134 are affixed to support 96. Knife block gib 126 allows movement of the knife assembly for prepositioning the knife inserts for cutting. The movement is accomplished by adjustment screw or means 130 and spring 132. Screws 128 lock the positioning once it is correctly set.

Figure 7:
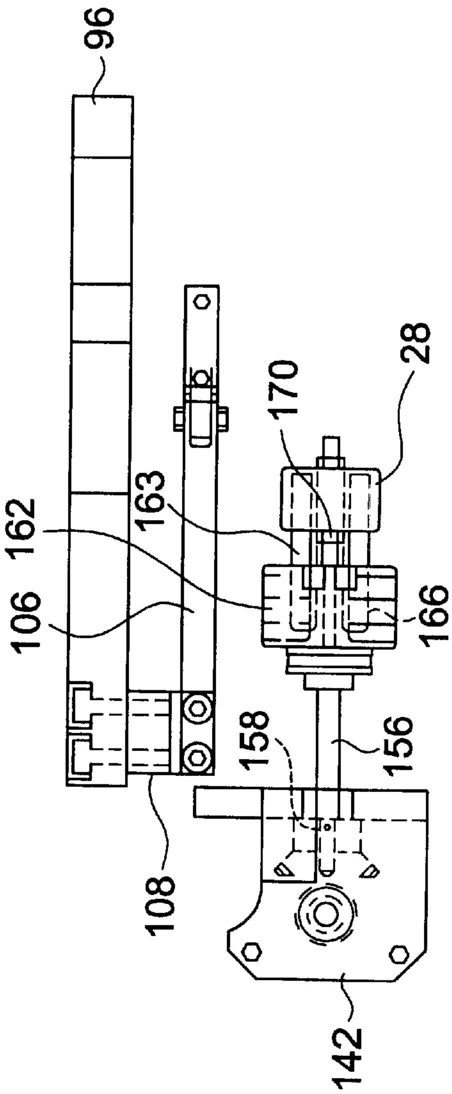
FIG. 7 is a top elevational view of the portion of the cutting apparatus illustrated in FIG. 5.

As illustrated in FIGS. 2, 5 and 7, adjustment means 30 for stop 28 includes a stepper plate 140 and a guide block 142 for mounting the adjustment means on support 60. The stepper plate and the guide block are connected to the support by suitable fasteners.

Stepper plate 140 and guide block 142 are connected by a plurality of adjustment posts 144. A limit indicator nut 146 is slidably mounted on posts 144 for axial, non-rotational movement between stepper plate 140 and guide block 142. The engagement of post 144 and indicator nut 146 restrain the indicator nut against relative rotation.

Stepper motor coupling 52 is connected to stepper motor 53 and is attached to one of the adjustment posts 144. A drive shaft 148 extends from and is operatively coupled to stepper motor coupling 52 to rotate with the stepper motor rotor, but is fixed axially relative to the stepper motor, stepper plate 140, guide block 142 and adjustment post 144. The external surface of drive shaft 148 is provided with a helical thread 150 which engages a mating helical thread on the interior of limit indicator nut 146. As the stepper motor rotates shaft 148, the limit indicator nut moves axially, along the shaft since the indicator nut is restrained against rotation by the adjustment posts 144. Engagement of indicator nut 144 with stepper motor coupling 52 in one direction or guide block 142 in the opposite direction sets limits for the maximum rotation of the motor in either one direction or the other direction, thereby limiting the degree of adjustment of stop 28.

The end of drive shaft 148 remote from stepper motor 53 rotatably mounted in guide block 142 by a bearing 152. The drive shaft extends beyond bearing 152 and terminates in a miter gear 154.

A back stop screw 156 is also rotatably mounted by a bearing 158 in guide block 142 about an axis transverse to the axis of rotation of drive shaft 148. The end of back stop screw 156 adjacent drive shaft 148 terminates in a miter gear 160 which meshes with miter gear 154. The engagement of miter gears 154 and 160 transmit the rotation of the stepper motor and drive shaft 148 to back stop screw 156.

Back stop screw 156 extends through a screw back stop or fixed screw block 162, and provides the adjustment screw for stop 28. The back stop screw is rotatably mounted in and relative to back stop 162 by thrust bearing 164 and bearing 166.

The fixedly mounted back stop or fixed screw block 162 has dowel pins 163 extending axially toward and received within mating passages within the stop or stop block 28. The sliding engagement of the stop block and the dowel pins allows the stop block to move along the axis of back stop screw 156, but prevents relative rotation of stop 28 about the longitudinal axis of back stop screw 156. A spring or spring loaded coupling 170 preloads stop 28 against thrust bearing 164 to eliminate movement of stop 28 from machine clearances between mating threads of screw 156 and stop 28.

The end of back stop screw 156 adjacent stop 28 is formed with an external, fine pitch thread which threadedly engages a mating internal thread on stop 28. Because of the sliding connection provided by the dowel pins, the stop can move axially relative to back stop 162, but cannot rotate relative to the back stop screw or the back stop such that the stop will move along the longitudinal axis of the back stop screw in one axial direction or the other depending on the rotational direction of back stop screw 156. This controlled axial movement of stop 28 varies the positioning of stop 28 relative to cutter 26 to precisely set the length of the strip material being cut.

Figure 4:
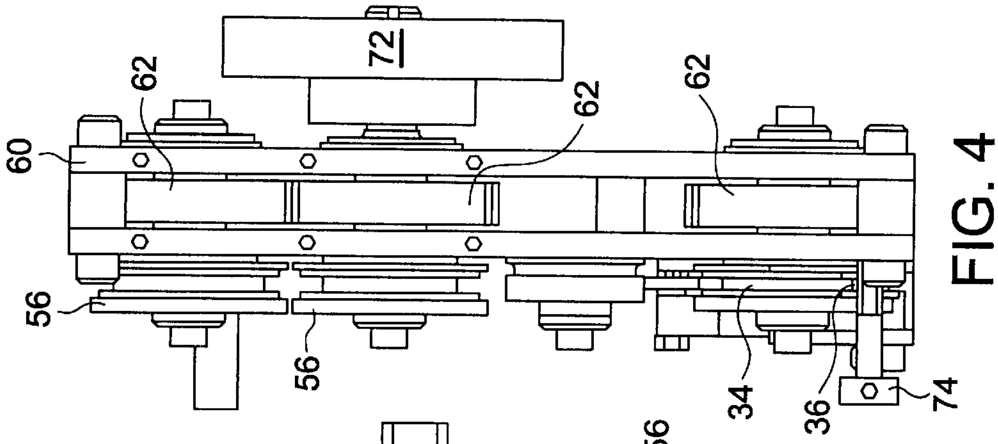
FIG. 4 is an end elevational view of the cutting apparatus of FIG. 2.
Figure 3:
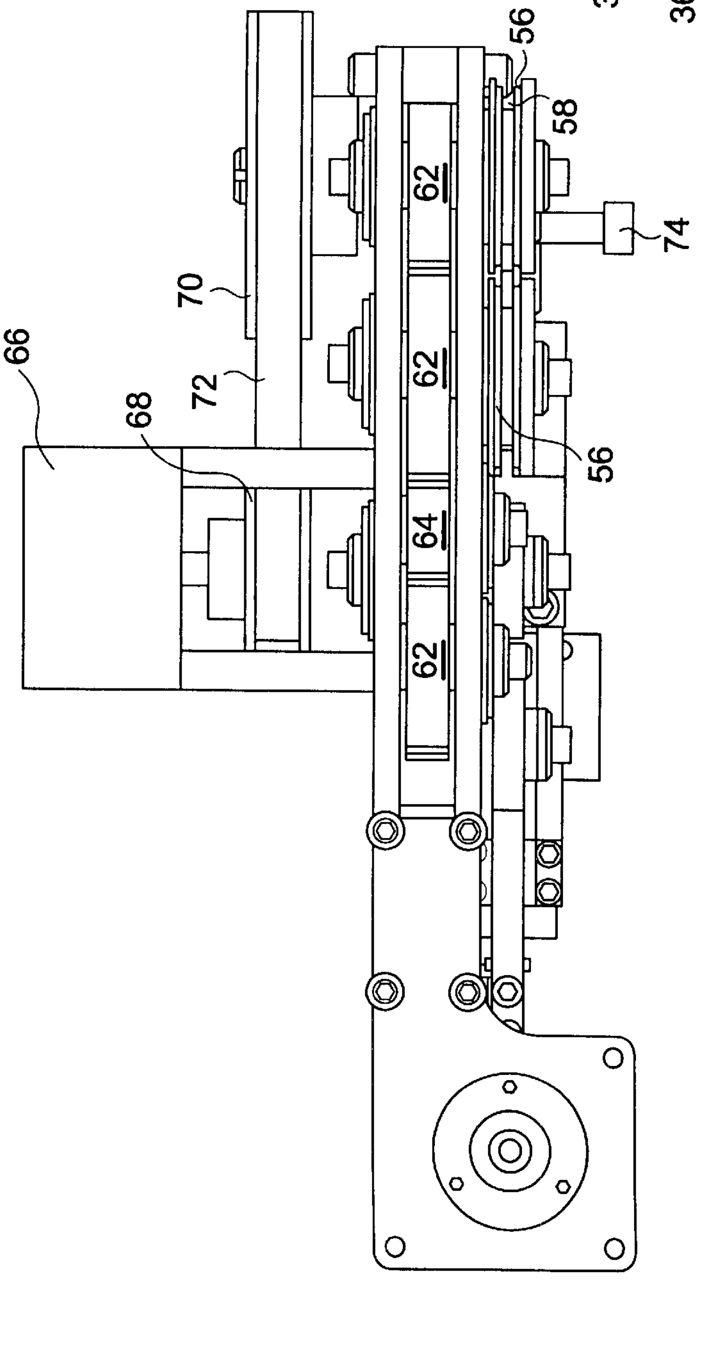
FIG. 3 is a top plan view of the cutting apparatus of FIG. 2.

The orientation of the various parts of cutting apparatus 20 permits the device to have a relatively narrow width as illustrated particularly in FIG. 4. This narrow width allows a number of the cutting apparatus of the present invention to be located side-by-side to facilitate the processing of multiple cut strips simultaneously.

In operation, strip material from supply 22 is conveyed to drivers 56 and is directed along the serpentine path defined by the drivers. The material then passes through the nip between feed drive wheels 34 and 36 and into the feed chute 38. From the feed chute, the strip material is fed into the strip holder 40 until the free end engages stop 28. Upon engagement of the stop 28, the timing of the apparatus is set such that knife cam 44 actuates cutter 26 to sever the measured length of strip material from the remainder of the strip material. After severing of the strip material, ejector cam 46 actuates the ejector pins to force the cut strip material from the strip holder downwardly from the machine, for example, into a package receptacle, for downstream processing.

While a particular embodiment has been chosen to illustrate the invention, it will be understood by those skilled in the art that various changes and modifications can be made therein without departing from the scope of the invention as defined in the appended claims.

What is claimed is:

1. An apparatus for precisely cutting lengths of strip material, comprising:

a supply of magnetizable strip material;

feed means for conveying said strip material from said supply;

a vertically reciprocating cutter mounted downstream of said feed means, said cutter having a cutting edge;

a cutter actuator coupled to said cutter to move and push said cutter against and through said strip material, said cutter actuator including a rotating cam that engages an end of said cutter remote from said cutting edge of said cutter;

an adjustable stop, movably mounted adjacent said cutter, for engaging an end of said strip material and setting a precise length of said strip material being cut;

adjustment means, coupled to said stop, for moving said stop relative to said cutter along a longitudinal axis of the length of said strip material being cut, said adjustment means including a rotatably mounted rod with a fine pitch screw thread and an electric stepper motor connected to and controlling rotations of said rod, said stop threadedly engaging said rod;

a stationary, magnetized strip holder positioned adjacent said cutter and extending between said feed means and said stop;

at least one vertically reciprocating ejector pin positioned adjacent said strip holder; and an ejector pin actuator coupled to said ejector pin and actuating said ejector pin to move and push said strip material from said strip holder after cutting, said pin actuator including a rotating cam that pushes said ejector pin against said material strip.

2. An apparatus according to claim 1 wherein said supply comprises a supply wheel; and said feed means comprises a plurality of rotatable drivers rotatably driven by a drive train, said rotating cams being driven by said drive train.

3. An apparatus according to claim 1 wherein said strip holder comprises a downwardly facing strip receiving lower surface.

4. An apparatus according to claim 1 wherein said strip holder comprises a horizontal surface engaging a top surface of said strip material and vertical surfaces engaging side edges of said strip material.

5. An apparatus according to claim 1 wherein said strip holder is immediately adjacent said cutter.

6. An apparatus for precisely cutting lengths of strip material, comprising:

a supply of magnetizable strip material;

feed means for conveying said strip material from said supply;

a vertically reciprocating cutter mounted downstream of said feed means, said cutter having a cutting edge;

a cutter actuator coupled to said cutter to move and push said cutter against and through said strip material, said cutter actuator including a rotating cam that engages an end of said cutter remote from said cutting edge of said cutter;

an adjustable stop, movably mounted adjacent said cutter, for engaging an end of said strip material and setting a precise length of said strip material being cut;

adjustment means, coupled to said stop, for moving said stop relative to said cutter along a longitudinal axis of the length of said strip material being cut, said adjustment means including a rotatably mounted rod with a fine pitch screw thread and an electric stepper motor connected to and controlling rotations of said rod, said stop threadedly engaging said rod;

a magnetized strip holder positioned adjacent said cutter and extending between said feed means and said stop, said strip holder including two members having a space therebetween;

at least one vertically reciprocating ejector pin positioned adjacent said strip holder; and an ejector pin actuator coupled to said ejector pin and actuating said ejector pin to move through said space and push said strip material from said strip holder after cutting, said pin actuator including a rotating cam that pushes said ejector pin against said material strip.

7. An apparatus according to claim 6 wherein said strip holder is stationary.

8. An apparatus for precisely cutting lengths of strip material, comprising:

a supply of magnetically attractable strip material;

feed means for conveying said strip material from said supply;

a reciprocating cutter mounted downstream of said feed means;

an adjustable stop, movably mounted adjacent said cutter, for engaging an end of said strip material and setting a precise length of said strip material being cut;

a stationary magnetized strip holder positioned adjacent said cutter and extending between said feed means and said stop;

at least one reciprocating ejector pin positioned adjacent said strip holder; and an ejector pin actuator coupled to said ejector pin and actuating said pin to move and push said strip material from said strip holder after cutting.

9. An apparatus according to claim 8 wherein adjustment means is coupled to said stop and moves said stop relative to said cutter along a longitudinal axis of the length of said strip material being cut.

10. An apparatus according to claim 9 wherein said adjustment means comprises a rotatably mounted rod with a fine pitch screw thread; and said stop threadedly engages said rod.

11. An apparatus according to claim 10 wherein said stop comprises a spring loaded coupling connecting said stop to said rod.

12. An apparatus according to claim 10 wherein said adjustment means comprises an electric stepper motor connected to and controlling rotations of said rod.

13. An apparatus according to claim 12 wherein said adjustment means comprises a set of gears coupling said stepping motor to said rod.

14. An apparatus according to claim 8 wherein said strip holder is immediately adjacent said cutter.

15. An apparatus according to claim 8 wherein said strip holder comprises a downwardly facing strip receiving lower surface.

16. An apparatus according to claim 8 wherein said strip holder comprises a horizontal surface engaging a top surface of said strip material and vertical surfaces engaging side edges of said strip material.

17. An apparatus according to claim 8 wherein said pin actuator comprises a rotating cam that pushes said ejector pin against said material strip.

18. An apparatus according to claim 17 wherein said ejector pin is coupled to a rotatable follower which engages said rotating cam.

19. An apparatus according to claim 8 wherein said strip holder comprises two members having a space therebetween through which said ejector pin moves.

20. An apparatus according to claim 8 wherein said cutter is positioned above said strip holder and reciprocates in a vertical direction; and a cutter actuator is coupled to said cutter to move and push said cutter against and through said strip material.

21. An apparatus according to claim 20 wherein said cutter actuator comprises a rotating cam that engages an end of said cutter remote from said strip material.

22. An apparatus according to claim 21 wherein said cutter comprises a rotatable cam follower which engages said rotating cam.

23. An apparatus according to claim 8 wherein said feed means comprises a supply wheel and a plurality of rotatable drivers.

24. An apparatus according to claim 23 wherein each of said drivers is annular with an annular peripheral groove receiving said strip material.

25. An apparatus according to claim 23 wherein said drivers define a serpentine path for said strip material.

26. An apparatus for precisely cutting lengths of strip material, comprising:

a supply of magnetically attractable strip material;

feed means for conveying said strip material from said supply;

a reciprocating cutter mounted downstream of said feed means;

an adjustable stop, movably mounted adjacent said cutter, for engaging an end of said strip material and setting a precise length of said strip material being cut;

a magnetized strip holder positioned adjacent said cutter, extending between said feed means and said stop, and including a downwardly facing strip receiving lower surface, said strip holder including two members having a space therebetween;

at least one reciprocating ejector pin positioned adjacent said strip holder; and an ejector pin actuator coupled to said ejector pin and actuating said pin to move through said space and push said strip material from said strip holder after cutting.

27. An apparatus according to claim 26 wherein adjustment means is coupled to said stop and moves said stop relative to said cutter along a longitudinal axis of the length of said strip material being cut.

28. An apparatus according to claim 27 wherein said adjustment means comprises a rotatably mounted rod with a fine pitch screw thread; and said stop threadedly engages said rod.

29. An apparatus according to claim 28 wherein said stop comprises a spring loaded coupling connecting said stop to said rod.

30. An apparatus according to claim 28 wherein said adjustment means comprises an electric stepper motor connected to and controlling rotations of said rod.

31. An apparatus according to claim 30 wherein said adjustment means comprises a set of gears coupling said stepping motor to said rod.

32. An apparatus according to claim 26 wherein said strip holder is immediately adjacent said cutter.

33. An apparatus according to claim 26 wherein said lower surface comprises a horizontal surface engaging a top surface of said strip material and vertical surfaces engaging side edges of said strip material.

34. An apparatus according to claim 26 wherein said pin actuator comprises a rotating cam that pushes said ejector pin against said material strip.

35. An apparatus according to claim 34 wherein said ejector pin is coupled to a rotatable follower which engages said rotating cam.

36. An apparatus according to claim 26 wherein said cutter is positioned above said strip holder and reciprocates in a vertical direction; and a cutter actuator is coupled to said cutter to move and push said cutter against and through said strip material.

37. An apparatus according to claim 36 wherein said cutter actuator comprises a rotating cam that engages an end of said cutter remote from said strip material.

38. An apparatus according to claim 37 wherein said cutter comprises a rotatable cam follower which engages said rotating cam.

39. An apparatus according to claim 26 wherein said feed means comprises a supply wheel and a plurality of rotatable drivers.

40. An apparatus according to claim 39 wherein each of said drivers is annular with an annular peripheral groove receiving said strip material.

41. An apparatus according to claim 39 wherein said drivers define a serpentine path for said strip material.

42. An apparatus for precisely cutting lengths of strip material, comprising:

a supply of magnetically attractable strip material;

feed means for conveying said strip material from said supply;

a reciprocating cutter mounted downstream of said feed means;

an adjustable stop, movably mounted adjacent said cutter, for engaging an end of said strip material and setting a precise length of said strip material being cut;

a magnetized strip holder positioned adjacent said cutter extending between said feed means and said stop, said strip holder including two members having a space therebetween;

at least one reciprocating ejector pin positioned adjacent said strip holder; and an ejector pin actuator coupled to said ejector pin and actuating said pin to move through said space and push said strip material from said strip holder after cutting.

43. An apparatus according to claim 42 wherein adjustment means is coupled to said stop and moves said stop relative to said cutter along a longitudinal axis of the length of said strip material being cut.

44. An apparatus according to claim 43 wherein said adjustment means comprises a rotatably mounted rod with a fine pitch screw thread; and said stop threadedly engages said rod.

45. An apparatus according to claim 44 wherein said stop comprises a spring loaded coupling connecting said stop to said rod.

46. An apparatus according to claim 44 wherein said adjustment means comprises an electric stepper motor connected to and controlling rotations of said rod.

47. An apparatus according to claim 46 wherein said adjustment means comprises a set of gears coupling said stepping motor to said rod.

48. An apparatus according to claim 42 wherein said strip holder is immediately adjacent said cutter.

49. An apparatus according to claim 42 wherein said strip holder comprises a downwardly facing strip receiving lower surface.

50. An apparatus according to claim 42 wherein said strip holder comprises a horizontal surface engaging a top surface of said strip material and vertical surfaces engaging side edges of said strip material.

51. An apparatus according to claim 42 wherein said pin actuator comprises a rotating cam that pushes said ejector pin against said material strip.

52. An apparatus according to claim 51 wherein said ejector pin is coupled to a rotatable follower which engages said rotating cam.

53. An apparatus according to claim 42 wherein said cutter is positioned above said strip holder and reciprocates in a vertical direction; and a cutter actuator is coupled to said cutter to move and push said cutter against and through said strip material.

54. An apparatus according to claim 53 wherein said cutter actuator comprises a rotating cam that engages an end of said cutter remote from said strip material.

55. An apparatus according to claim 54 wherein said cutter comprises a rotatable cam follower which engages said rotating cam.

56. An apparatus according to claim 42 wherein said feed means comprises a supply wheel and a plurality of rotatable drivers, wherein said supply wheel supports said supply of strip material.

57. An apparatus according to claim 56 wherein each of said drivers is annular with an annular peripheral groove receiving said strip material.

58. An apparatus according to claim 56 wherein said drivers define a serpentine path for said strip material.

* * * * *